(12) United States Patent
Dhoot et al.

(10) Patent No.: US 10,713,349 B2
(45) Date of Patent: *Jul. 14, 2020

(54) AUTHENTICATION MANAGEMENT

(71) Applicant: International Business Machines Corporation, Armonk, NY (US)

(72) Inventors: Akash U. Dhoot, Pune (IN); Nitin S. Jadhav, Pune (IN); Shailendra Moyal, Pune (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/991,958

(22) Filed: May 29, 2018

(65) Prior Publication Data
US 2018/0276368 A1 Sep. 27, 2018

Related U.S. Application Data

(63) Continuation of application No. 15/973,592, filed on May 8, 2018, now Pat. No. 10,204,218, which is a (Continued)

(51) Int. Cl.
G06F 21/00 (2013.01)
G06F 21/45 (2013.01)
G06F 21/31 (2013.01)

(52) U.S. Cl.
CPC ............ *G06F 21/45* (2013.01); *G06F 21/31* (2013.01); *G06F 2221/2111* (2013.01)

(58) Field of Classification Search
CPC ... G06F 21/45; G06F 21/31; G06F 2221/2111
See application file for complete search history.

(56) References Cited

U.S. PATENT DOCUMENTS 7,245,724 B1* 7/2007 Chesson ............... H04L 63/068
380/270
8,271,799 B2 9/2012 Wang
(Continued)

FOREIGN PATENT DOCUMENTS

CN 1952855 A 4/2007

OTHER PUBLICATIONS

Traore et al., "Dynamic Sample Size Detection in Learning Command Line Sequence for Continuous Authentication", IEEE Transactions on Systems, Man, and Cybernetics, Part B (Cybernetics) (vol. 42, Issue: 5, Oct. 2012).*
(Continued)

*Primary Examiner* — Morshed Mehedi
(74) *Attorney, Agent, or Firm* — Robert D. Bean

(57) ABSTRACT

Disclosed aspects relate to authentication management. A first valid authentication input may be established with respect to access enablement to a computing asset. A second valid authentication input may be established with respect to access enablement to the computing asset. A triggering event may be detected. The first valid authentication input may be deactivated based on the triggering event. The second valid authentication input may be activated based on the triggering event. The graphical user interface may be presented which may appear to prompt for the first valid authentication input. The second valid authentication input may be received via the graphical user interface. Access enablement with respect to the computing asset may be authenticated in response to receiving the second valid authentication input.

18 Claims, 6 Drawing Sheets

Related U.S. Application Data continuation of application No. 15/973,854, filed on May 8, 2018, which is a continuation of application No. 15/694,016, filed on Sep. 1, 2017, now Pat. No. 9,996,687, which is a continuation of application No. 15/375,440, filed on Dec. 12, 2016, now Pat. No. 10,007,780.

(56) References Cited

U.S. PATENT DOCUMENTS

| | | | | |
|---|---|---|---|---|
| 8,789,154 | B2* | 7/2014 | Li | H04L 63/0428 726/6 |
| 9,270,670 | B1 | 2/2016 | Fitzgerald | |
| 9,444,805 | B1* | 9/2016 | Saylor | H04L 63/08 |
| 9,760,698 | B2* | 9/2017 | Pisz | B60H 1/00657 |
| 2006/0046689 | A1* | 3/2006 | Kim | H04L 63/08 455/406 |
| 2006/0294392 | A1* | 12/2006 | Veprek | G06F 21/31 713/183 |
| 2013/0139222 | A1* | 5/2013 | Kirillin | H04L 67/02 726/4 |
| 2013/0312087 | A1* | 11/2013 | Latzina | G06F 21/00 726/19 |
| 2016/0020802 | A1* | 1/2016 | Lee | H04W 12/06 455/558 |

OTHER PUBLICATIONS

Vachaspati et al., "A novel soft computing authentication scheme for textual and graphical passwords", International Journal of Computer Applications (0975-8887) vol. 71—No. 10, May 2013.*

IBM, List of IBM Patents or Patent Applications Treated as Related, Appendix P, dated Jun. 6, 2018, 2 pages.

Pending U.S. Appl. No. 15/973,584, filed May 8, 2018, entitled: "Authentication Management".

Pending U.S. Appl. No. 15/375,440, filed Dec. 12, 2016, entitled: "Authentication Management".

Pending U.S. Appl. No. 15/694,016, filed Sep. 1, 2016, entitled: "Authentication Management".

Pending U.S. Appl. No. 15/973,592, filed May 8, 2018, entitled: "Authentication Management".

Rodrigues, M.A.F.; "Combating Shoulder-Surfing: A Hidden Button Gesture Based Scheme"; <http://www.ee.oulu.fi/~vassilis/files/theses/MSc_Rodrigues_2010.pdf>.

Dhoot et al., U.S. Appl. No. 15/375,440, filed Dec. 12, 2016, titeld "Authentication Management," pp. 1-65.

Dhoot et al., U.S. Appl. No. 15/694,016, filed Sep. 1, 2017, titeld "Authentication Management," pp. 1-59.

* cited by examiner

AUTHENTICATION MANAGEMENT

BACKGROUND

This disclosure relates generally to computer systems and, more particularly, relates to authentication management. It may be desirable to perform authentication management as efficiently as possible. The number of computer systems that make use of authentication management techniques is increasing. As the number of computer systems using authentication management techniques increases, the need for authentication management efficiency may increase.

SUMMARY

Aspects of the disclosure relate to authentication management. A computing device may detect an indication that configures the computing device to operate in a temporary password authentication mode in which access authentication is performed using a temporary password (e.g., rather than a primary password). The temporary password may be pre-configured to have a fixed lifetime or number of uses. A user interface indication may be provided to identify that temporary password authentication is activated with respect to the computing device. A tandem password input and reset method may be used to allow a user to authenticate with the computing device as well as reset the temporary password. The tandem password input and reset method may use a delimiter. The temporary password authentication mode may be deactivated in the event that the temporary password is incorrectly entered a threshold number of times. When the temporary password authentication mode is deactivated, the computing device may be configured to convert back to primary password authentication mode. The deactivated temporary password may be reset and reactivated in response to authentication using the primary password. Password authentication techniques may be used to initiate execution of a command on the computing device.

Disclosed aspects relate to authentication management. A first valid authentication input may be established with respect to access enablement to a computing asset. A second valid authentication input may be established with respect to access enablement to the computing asset. The second valid authentication input may differ from the first valid authentication input. A triggering event may be detected. In response to detecting the triggering event, the first valid authentication input may be deactivated with respect to access enablement to the computing asset. In response to detecting the triggering event, the second valid authentication input may be activated with respect to access enablement to the computing asset. A graphical user interface may be presented. The graphical user interface may appear to prompt for the first valid authentication input. The second valid authentication input may be received via the graphical user interface. In response to receiving the second valid authentication input, access enablement with respect to the computing asset may be authenticated.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
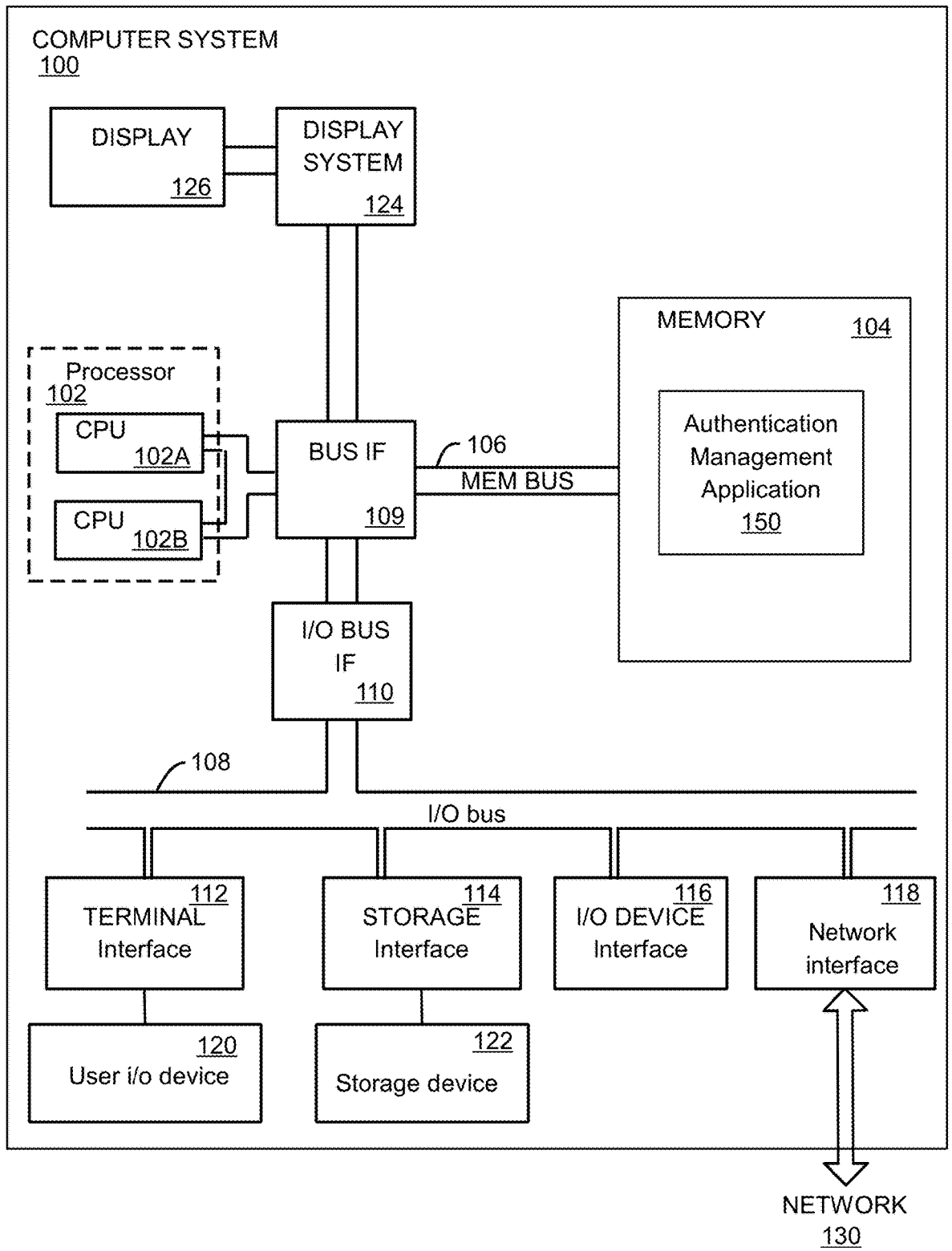
FIG. 1 depicts a high-level block diagram of a computer system for implementing various embodiments of the present disclosure, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to authentication management. A computing device may detect an indication (e.g., triggering event) that configures the computing device to operate in a temporary password authentication mode in which access authentication is performed using a temporary password (e.g., rather than a primary password). The temporary password may be pre-configured to have a fixed lifetime or number of uses. A user interface indication may be provided to identify that temporary password authentication is activated with respect to the computing device. A tandem password input and reset method may be used to allow a user to authenticate with the computing device as well as reset (e.g., change, update) the temporary password. The tandem password input and reset method may use a delimiter. The temporary password authentication mode may be deactivated in the event that the temporary password is incorrectly entered a threshold number of times. When the temporary password authentication mode is deactivated, the computing device may be configured to convert back to primary password authentication mode (e.g., in which the primary password, rather than the temporary password, is used for access authentication). The deactivated temporary password may be reset and reactivated in response to authentication using the primary password. Password authentication techniques may be used to initiate execution of a command on the computing device. Leveraging a temporary password and dynamic password configuration with respect to access management may be associated with benefits including access authentication security, data privacy, and operation efficiency.

Computing devices may make use of a variety of authentication protocols to verify the authorization of users to access particular functions, data, or other aspects of the computing device. Aspects of the disclosure relate to the recognition that, in some situations, the authentication protocols of computing devices may be compromised if observed by unauthorized users (e.g., in public places). Accordingly, aspects of the disclosure relate to disguising the authentication input to a computing device, such that unauthorized access to computing devices may be prevented. Aspects of the disclosure relate to a computing device configured to convert to an alternate (e.g., flipside, secondary) authentication protocol in response to detection of a triggering event. In this way, authentication inputs may be protected, and data of computing devices may be secured.

Aspects of the disclosure include a system, method, and computer program product for authentication management. A first valid authentication input may be established with respect to access enablement to a computing asset. A second valid authentication input may be established with respect to access enablement to the computing asset. The second valid authentication input may differ from the first valid authentication input. A triggering event may be detected. Based on and in response to detecting the triggering event, the first valid authentication input may be deactivated with respect to access enablement to the computing asset. Based on and in response to detecting the triggering event, the second valid authentication input may be activated with respect to access enablement to the computing asset. A graphical user interface may be presented. The graphical user interface may appear to prompt for the first valid authentication input. The second valid authentication input may be received via the graphical user interface. Based on an in response to the second valid authentication input, access enablement with respect to the computing asset may be authenticated.

In embodiments, the second valid authentication input may include a first value and a second value which differs from the first value. In embodiments, the second valid authentication input may be structured to include a delimiter. In embodiments, a second valid authentication input including the delimiter may be received using a graphical user interface. In embodiments, access enablement may be authenticated based on the first value and the delimiter. In embodiments, access may be validated when the delimiter matches an established delimiter which corresponds to the second valid authentication input, and access may be invalidated when the delimiter mismatches the established delimiter which corresponds to the second valid authentication input. Altogether, aspects of the disclosure can have performance or efficiency benefits (e.g., reliability, speed, flexibility, responsiveness, stability, high availability, resource usage, productivity). Aspects may save resources such as bandwidth, disk, processing, or memory.

Turning now to the figures, FIG. 1 depicts a high-level block diagram of a computer system for implementing various embodiments of the present disclosure, according to embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store authentication management application 150. In embodiments, the authentication management application 150 may include instructions or statements that execute on the processor 102 or instructions or statements that are interpreted by instructions or statements that execute on the processor 102 to carry out the functions as further described below. In certain embodiments, the authentication management application 150 is implemented in hardware via semiconductor devices, chips, logical gates, circuits, circuit cards, and/or other physical hardware devices in lieu of, or in addition to, a processor-based system. In embodiments, the authentication management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

Figure 2:
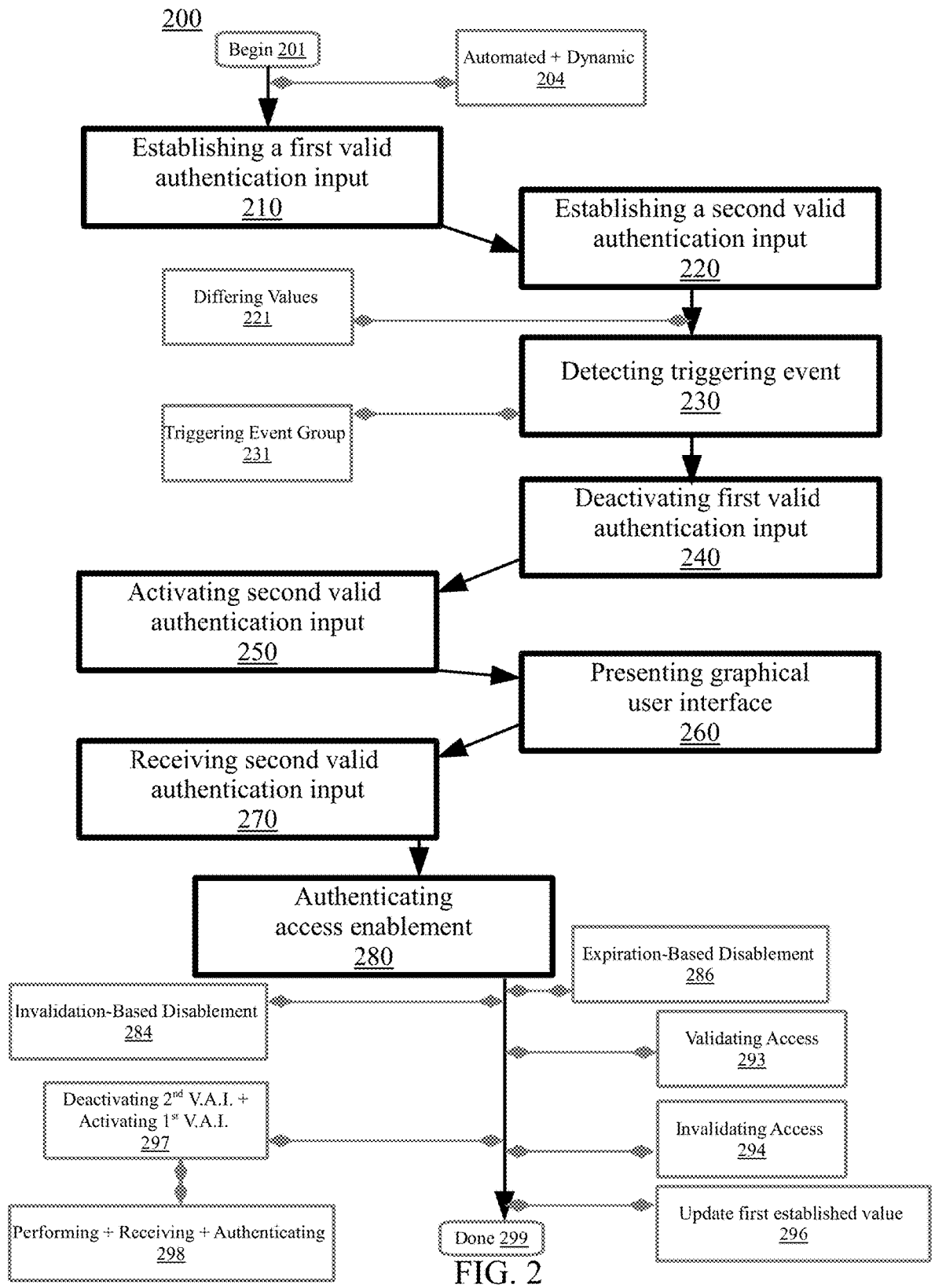
FIG. 2 is a flowchart illustrating a method for authentication management, according to embodiments.

FIG. 2 is a flowchart illustrating a method 200 for authentication management, according to embodiments. Aspects of FIG. 2 relate to using a second valid authentication input (e.g., temporary password) to authenticate access enablement with respect to a computing asset. The computing asset may include computer hardware (e.g., smartphones, tablets, laptop computers, desktop computers, server devices, client devices) or software (e.g., application programs, workloads, virtual machines, logical partitions) configured to implement aspects of authentication management. Generally, authentication management may include the process of verifying credentials by comparing authentication inputs received by the computing asset with established (e.g., pre-configured, predetermined) credentials (e.g., saved on the computing asset or in a database). In embodiments, aspects of the disclosure relate to using first and second valid authentication inputs (e.g., credentials, passwords) to secure a computing asset from unauthorized access. Leveraging a second valid authentication input (e.g., temporary password) and dynamic authentication input modification (e.g., password changes) with respect to access management may be associated with benefits including access authentication security, data privacy, and operation efficiency. The method 200 may begin at block 201.

In embodiments, the establishing, the establishing, the detecting, the deactivating, the activating, the presenting, the receiving, the authenticating, and other steps described herein may each occur in an automated and dynamic fashion at block 204. The operational steps may each occur in an automated fashion without user intervention. In embodiments, the operational steps described herein may be carried out by an internal authentication management module maintained in a persistent storage device of a server or locally connected hardware device. In embodiments, the operational steps described herein may be carried out by an external authentication management module hosted by a remote computing device or server (e.g., accessible via a subscription, usage-based system, or other service model). In this way, aspects of authentication management may be performed using automated computing machinery without manual action. In embodiments, the operational steps may each occur in a dynamic fashion to streamline authentication management. For instance, the operational steps described herein may be occur/be performed in real-time, ongoing, or on-the-fly. As an example, one or more steps described herein may be performed simultaneously (e.g., deactivating the first valid authentication input and activating the second valid authentication input may be performed simultaneously in dynamic fashion) in order to streamline (e.g., facilitate, promote, enhance) authentication management. Other methods of performing the steps described herein are also possible.

At block 210, a first valid authentication input may be established. This may occur with respect to access enablement to a computing asset. Generally, establishing can include defining, instituting, specifying, setting, assigning, designating, or otherwise creating the first valid authentication input. The first valid authentication input may include a form of credentials provided to the computing asset in order to verify the authorization of a user to access the computing asset. For instance, the first valid authentication input may include a sequence or string of characters, symbols, or other information that may be used to verify the authorization of a user to access the computing asset. As examples, the first valid authentication input may include a password, token (e.g., hardware or software token), biometric data (e.g., fingerprint, retina scan), answer to a security question, visual identifier, pattern input, or the like. In embodiments, the first valid authentication input may serve as a default or primary authentication key of a user in order to authenticate with the computing asset (e.g., the key/password typically entered by the user to verify authorization to use the computing asset). In embodiments, establishing the first valid authentication input may include providing the user with a graphical user interface (e.g., dialogue box, menu) via which the first valid authentication input may be defined. The computing asset may prompt a user to create an authorization input, and subsequently receive the first valid authentication input from the user. As an example, the computing asset may receive a first valid authentication input of "LetMeIn123." The first valid authentication input may be saved, stored, or recorded in local memory of the computing asset, or maintained by an external computing asset (e.g., remote cloud server). In embodiments, the first valid authentication input may be configured to be accessible by the computer asset for use to verify subsequent authentication inputs. Other methods of establishing the first valid authentication input are also possible.

At block 220, a second valid authentication input may be established. This may occur with respect to access enablement to the computing asset. The second valid authentication input may differ from the first valid authentication input. Generally, establishing can include defining, instituting, specifying, setting, assigning, designating, or otherwise creating the second valid authentication input. The second valid authentication input may include a form of credentials provided to the computing asset in order to verify the authorization of a user to access the computing asset. As described herein, the second valid authentication input may include a sequence or string of characters, symbols, or other information that may be used to verify the authorization of a user to access the computing asset (e.g., password, token, biometric data, visual identifier, pattern input). In embodiments, the second valid authentication input may serve as a temporary, provisional, or disposable authentication key that may be used by a user in order to authenticate with the computing asset in situations where the first valid authentication input may be compromised (e.g., public locations where input of the first valid authentication input may be overseen by unauthorized users). As an example, the second valid authentication input may include a password of "refrigerator." In certain embodiments, the second valid authentication input may be associated with a limited number of uses (e.g., 1 use, 3 uses), or an expiration period (e.g., 10 minutes, 1 hour, 1 day) after which the second valid authentication input will become invalid (e.g., may no longer grant access to the computing asset). In embodiments, establishing the second valid authentication input may include prompting a user to provide a second authentication input that differs from (e.g., includes at least one different character, symbol, or other element, achieves a dissimilarity threshold) the first valid authentication input. The computing asset may receive the second valid authentication input, and maintain it together with (e.g., in the same database, memory location, external computing asset) the first valid authentication input, such that both the first and second valid authentication inputs may be accessible by the computer asset for use to verify subsequent authentication inputs. Other methods of establishing the second valid authentication input are also possible.

In embodiments, differing values may occur at block 221. The second valid authentication input may include a first value. The second authentication input may include a second value. The second value may differ from the first value. In embodiments, the first and second values may include alphanumeric sequences, strings of characters or symbols, or other collections of data or information. For instance, the first and second values may include passwords used to unlock a mobile computing device. In embodiments, the first value may include the first valid authentication input, and the second value may include the second valid authentication input. As an example, the first value may include a first valid authentication input of "terrier" and the second value may include a second valid authentication attempt of "beagle." In embodiments, the first value may include a delimiter (e.g., character or symbol configured to separate the first valid authentication input from the second valid authentication input) and the second value may include the second valid authentication input. As an example, the first value may include a delimiter of "#" and the second value may include a second valid authentication input of "parrot."

In embodiments, the first value may include the first valid authentication input, and the second value may include a command shortcut to execute an operation on the computing asset. As an example, the first value may include a first valid authentication input of "baseball" and the second value may include a command shortcut of "O" which indicates an instruction to the computing asset to open a pre-selected file or application.

In embodiments, aspects of the disclosure relate to using the first and second value to modify (e.g., update, establish, change) the second valid authentication input. As such, the first value may include a current second valid authentication input (e.g., first temporary password) and the second value may include a future (e.g., next, subsequent) second valid authentication input (e.g., second temporary password). The current second valid authentication input may be used to authenticate with the computing asset, and the future second valid authentication input may define a password to be used upon future authentication sessions with the computing asset. Consider the following example. A user may enter a first value including a first temporary password of "Socrates," and subsequently enter a second value (e.g., separated from the first value by a delimiter) of "Aristotle." Accordingly, the first value may be compared with a pre-established second valid authentication input, and be used to authenticate the user with the computing asset (e.g., allow the user to log in to the device, use a software program of the device, or the like), and the second value of "Aristotle" may be established with respect to the computing asset as a future second valid authentication input to be used for one or more subsequent authentication sessions. As such, the next time a user initiates an authentication session with the computing asset, the second value of "Aristotle" may be used (e.g., as the first value) to facilitate validation with respect to the computing asset. Other types of first and second values are also possible.

At block 230, a triggering event may be detected. Aspects of the disclosure, in embodiments, relate to dynamically configuring the access authentication protocol of the computing asset in response to detecting a trigger event. Generally, detecting can include sensing, discovering, recognizing, ascertaining, or otherwise determining the triggering event. The triggering event may include a parameter, criterion, condition, threshold, or other stipulation, which, when achieved, instigates/causes another event to occur. In embodiments, the triggering event may include an active trigger. For instance, the triggering event may include an action or event performed by a user (e.g., user input, gesture). In embodiments, the triggering event may include a passive trigger. For instance, the triggering event may include an occurrence or happening that takes place without the direct action of a user (e.g., geo-location based threshold, temporal based threshold). In embodiments, detecting may include utilizing a set of sensors included in the computing asset in order to monitor for the triggering event. The set of sensors may include devices configured to sense events or changes with respect to the environment of the computing asset. As examples, the set of sensors may include cameras, motion sensors (e.g., accelerometers, gyroscopes), brightness sensors, proximity sensors, biometric sensors, infrared sensors, global positioning systems, or the like. For instance, detecting may include using an accelerometer to sense that the orientation of the computing asset has been rotated 180 degrees clockwise, and ascertaining the orientation change as the triggering event. In embodiments, the triggering event may be predetermined (e.g., established, selected) by a user. For instance, a user of the computing asset may define a set of triggering events, such that a respective triggering event of the set of triggering events indicates a specific instruction to the computing asset (e.g., to initiate re-configuration of an access authentication protocol). Other methods of detecting the triggering event are also possible.

In embodiments, the triggering event may be selected from a group at block 231. The triggering event may include a user gesture. The user gesture may include a movement, motion, action, gesticulation, or other physical expression performed by a user. The user gesture may include body gestures, facial gestures, hand gestures, and the like. As examples, the gesture may include a movement-based pattern (e.g., flick, twist, tap), a movement detected by a sensor of the computing asset (e.g., facial expression, body language expression detected by a camera) or other type of user gesture. The triggering event may include a user input on an unlocked graphical user interface. The user input may include an instruction, command, directive, or other activity performed to relay data to the computing asset. As examples, the user input may include a series of button presses, a setting configuration, a pattern drawn on a screen of the computing asset, a voice command, or the like. The triggering event may include a device rotation which exceeds a threshold degree of rotation. The device rotation may include a change to the degree of orientation of the computing asset. As an example, the device rotation which exceeds a threshold degree may include a rotation of the computing asset from a vertical position to a horizontal position (e.g., 90 degree rotation) that exceeds a threshold degree of 70 degrees. The triggering event may include an unlock key sequence. The unlock key sequence may include a series of button presses, an input pattern (e.g., drawn on the screen), a number of taps, or the like. As an example, the unlock key sequence may include 5 successive presses of a particular button in less than a 20 second time interval. The triggering event may include a specific geo-location. The specific geo-location may include a particular geographic location (e.g., specific latitude or longitude), an area that achieves a particular area profile (e.g., public place, residential area, commercial district), or the like. As examples, the particular geographic location may include a specific address (e.g., pre-registered home address, office address) or a location recognized by the computing asset as a public area (e.g., airport, train station). The triggering event may include a distance from a particular geo-location that exceeds a threshold distance. As an example, the triggering event may include a detection that the computing asset has exceeded 100 meters from a pre-designated location (e.g., home address). The triggering event may include a temporal factor. The temporal factor may include a time frame, duration, period, chronological sequence of events, or other time-based parameter. As an example, the temporal factor may include a predetermined inactivity time period of 10 minutes (e.g., the triggering event occurs in the event that the computing asset is unused for 10 minutes) or a particular time of day (e.g., 9:15 AM). Other types of triggering events are also possible.

At block 240, the first valid authentication input may be deactivated. This may occur based on and in response to the detection of the triggering event. The deactivation may occur with respect to access enablement to the computing asset. Aspects of the disclosure, in embodiments, relate to dynamically configuring the access authentication protocol of the computing asset based on the security environment of the computing asset. Accordingly, in embodiments, the first valid authentication input may be deactivated in response to detection of the triggering event. Generally, deactivating can include disabling, nullifying, voiding, turning-off, shutting-down, or otherwise invalidating the first valid authentication input. In embodiments, deactivating may include modifying a set of access permissions of the computing asset to invalidate the first valid authentication input for use for authentication with the computing asset. As an example, the first valid authentication input may be removed from an index of valid inputs (e.g., inputs that may be used to demonstrate the authorization of a user to use the computing asset) maintained in an authentication management database by the computing asset, and added to an index of invalid inputs (e.g., inputs that may not be accepted as authorization credentials to use the computing asset) within the authentication management database. Accordingly, subsequent input of the first valid authentication input to the computing asset may be rejected as an incorrect authentication input. Other methods of deactivating the first valid authentication input are also possible.

At block 250, the second valid authentication input may be activated. This may occur based on and in response to the detection of the triggering event. The activation may occur with respect to access enablement to the computing asset. Aspects of the disclosure, in embodiments, relate to dynamically configuring the access authentication protocol of the computing asset based on the security environment of the computing asset. Accordingly, in embodiments, the second valid authentication input may be activated in response to detection of the triggering event. Generally, activating can include enabling, approving, instantiating, allowing, instituting, authorizing, or otherwise validating the second valid authentication input. In embodiments, activating may include modifying a set of access permissions of the computing asset to validate the second valid authentication input for use for authentication with the computing asset. As an example, the second valid authentication input may be added to an index of valid inputs maintained in an authentication management database by the computing asset. In embodiments, activating may include configuring the computing asset to accept input of the second valid authentication input as a correct authentication input, and providing a user (e.g., who entered the second valid authentication input) with access to one or more aspects of the computing asset. Other methods of activating the second valid authentication input are also possible.

Consider the following example. A first valid authentication input of "encyclopedia" and a second valid authentication input of "dictionary" may be established with respect to access enablement of a computing asset including a smartphone. In embodiments, prior to detection of a triggering event, the first valid authentication input of "encyclopedia" may be entered into the smartphone, and access to the smartphone may be provided to the user. As described herein, in certain embodiments, a triggering event may be detected. For instance, a triggering event of a device rotation may be detected, where the smartphone is rotated 90 degrees in a clockwise direction (e.g., a pre-established triggering event that instructs the computing asset to configure the authentication protocol of the smartphone). In response to detecting the triggering event, the first valid authentication input of "encyclopedia" may be deactivated, and the second valid authentication input of "dictionary" may be activated with respect to the smartphone. Subsequent to deactivation of the first valid authentication input and activation of the second valid authentication input, an authentication request may be received from a user that specifies an authentication input of "encyclopedia." As described herein, the received authentication input may be compared to an authentication management database, and it may be determined that the authentication input of "encyclopedia" has been registered as an invalid authentication input. Accordingly, the authentication input of "encyclopedia" may be rejected, and the authentication request may be denied. In certain embodiments, a second authentication request that specifies an authentication input of "dictionary" may be received by the computing asset. The received authentication input may be compared to the authentication management database, and it may be determined that the authentication input of "dictionary" has been registered as a valid authentication input. Accordingly, the authentication input of "dictionary" may be accepted, and the authentication request may be granted.

At block 260, the graphical user interface may be presented. The graphical user interface may appear to prompt for the first valid authentication input. Generally, presenting can include displaying, showing, exhibiting, conveying, or otherwise providing the graphical user interface. The graphical user interface may include a point of interaction between a user and the computing asset via which instructions, authentication inputs, commands, and other data may be shared between users and the computing asset. In embodiments, the graphical user interface may include a screen, field, or dialogue box that provides a user with an interface for authenticating with the computing asset. For instance, a log-in screen may be displayed that provides one or more fields for receiving authentication inputs may be generated and presented to a user. The graphical user interface may include one or more menus, password input fields, log-in credential boxes, or the like. In embodiments, the graphical user interface may appear to prompt for the first valid authentication input (e.g., such that unauthorized users may be unaware of the presence of/need for a second valid authentication input). For instance, in embodiments, the graphical user interface may include a message or text box that includes a prompt such as "Enter your password" or "Input password here," such that the graphical user interface may appear to be requesting input of the first valid authentication input (e.g., a primary password). In embodiments, presenting the graphical user interface may include maintaining (e.g., retaining, preserving) the same log-in interface both before and after detection of the triggering event. In certain embodiments, the graphical user interface may be configured to include a disguised indication that prompts a user for the second valid authentication input (e.g., text font change, screen color change, background image change, keypad button highlighting). Other methods of presenting the graphical user interface are also possible.

At block 270, the second valid authentication input may be received. The second valid authentication input may be received through the graphical user interface. Generally, receiving can include sensing, detecting, recognizing, collecting, or otherwise accepting delivery of the second valid authentication input. As described herein, the second valid authentication input may include a sequence or string of characters, symbols, or other information that may be used as a temporary, provisional, or disposable authentication key to verify authorization of a user to access the computing asset. The second valid authentication input may be activated in response to detection of a triggering event. In embodiments, receiving can include capturing the second valid authentication input via the graphical user interface. Consider the following example. Subsequent to detection of a triggering event (e.g., a predetermined series of button presses) and activation of the second valid authentication input (e.g., registering the second valid authentication input in an authentication management database), the computing asset may receive an authentication request from a user. For instance, the user may initiate a log-in process with the computing asset by opening an unlock-screen. Accordingly, the computing asset may be configured to accept input of a second valid authentication input including the password "qwerty" via the unlock-screen of the graphical user interface. In embodiments, receiving the second valid authentication input may include recording the second valid authentication input of "qwerty" in a log of received authentication inputs. Other methods of receiving the second valid authentication input through the graphical user interface are also possible.

At block 280, access enablement with respect to the computing asset may be authenticated. This may occur based on and in response to the reception of the second valid authentication input. As described herein, aspects of the disclosure relate to using the second valid authentication input to facilitate access authorization with respect to one or more aspects of the computing asset. Accordingly, access enablement may be authenticated in response to reception of the second valid authentication input. Generally, authenticating can include authorizing, verifying, confirming, allowing, permitting, approving, or otherwise validating access enablement with respect to the computing asset. In embodiments, authenticating may include comparing the second valid authentication input with an index of valid authentication inputs recorded in an authentication management database. In response to determining that the second valid authentication input matches (e.g., corresponds with) an authentication input of the authentication management database, access permission with respect to one or more aspects or features of the computing asset may be provided to a user. In embodiments, authenticating may include unlocking the computing asset to allow a user to perform one or more operations (e.g., running an application, executing a command, modifying settings or parameters) with respect to the computing asset. In certain embodiments, authenticating may include modifying a set of access permissions of the computing asset to disable one or more security measures, or enable access to one or more functions of the computing asset. Other methods of authenticating access enablement with respect to the computing asset are also possible.

In embodiments, invalidation-based disablement may occur at block 284. Aspects of the disclosure relate to the recognition that, in some situations, preventing access to the computing asset (e.g., in response to an unauthorized authentication attempt) may be associated with authentication security. Accordingly, aspects of the disclosure relate to invalidating (e.g., preventing) access to the computing asset based on the second valid authentication input, and requiring input of the first valid authentication input in order to grant access to the computing asset. In embodiments, access may be invalidated (e.g., nullified, negated, rejected) when authenticating. The invalidation may occur based on and in response to receiving the second valid authentication input. For instance, in certain embodiments, invalidating may include preventing access to the computing asset in response to receiving an incorrect authentication input. As an example, in response to receiving a second valid authentication input having a first value that does not match the established (e.g., recorded, predetermined) first value, access to the computing asset may be blocked. In embodiments, the second valid authentication input may be deactivated (e.g., voided, turned-off, shut-down) in response to invalidating access. The deactivation may occur with respect to access enablement to the computing asset. As described herein, deactivating may include modifying a set of access permissions of the computing asset to invalidate the second valid authentication input for use for authentication with the computing asset (e.g., the second valid authentication input may not be used to access the asset).

In embodiments, in response to invalidating access, the first valid authentication input may be activated (e.g., instantiated, allowed, instituted). The activation may occur with respect to access enablement to the computing asset. Activating the first valid authentication input may include modifying a set of access permissions of the computing asset to validate the first valid authentication input for use for authentication with the computing asset (e.g., the first valid authentication input may be used to access the asset). In response to invalidating access, the activation of the second valid authentication input may be disabled. In embodiments, disabling the activation of the second valid authentication input may include preventing further use of the second valid authentication input to access the computing asset. In embodiments, disabling the activation of the second valid authentication input may include configuring the system to ignore (e.g., discard, neglect) subsequent trigger events, such that the first valid authentication input must be provided in order for access to the computing asset to be granted. In response to invalidating access, the deactivation of the first valid authentication input may be disabled. In embodiments, disabling the first valid authentication input may include allowing (e.g., reactivating, permitting) access to the computing asset using the first valid authentication input. For instance, in embodiments, the authentication protocol of the computing asset may be reconfigured such that only authentication requests that provide the first valid authentication input are granted access to the computing asset. Other methods of invalidation-based disablement are also possible.

In embodiments, expiration-based disablement may occur at block 286. Aspects of the disclosure relate to the recognition that, in some situations, it may be desirable to specify an expiration parameter for the second valid authentication input (e.g., such that the second valid authentication input is valid for a fixed period). Accordingly, aspects of the disclosure relate to configuring an expiration for the second valid authentication input. Generally, configuring can include defining, selecting, specifying, setting, or otherwise designating the expiration for the second valid authentication input. In embodiments, configuring may include defining a set time period during which the second valid authentication input may be used to authenticate with the computing asset. For instance, an expiration of "15 minutes" may be specified for the second valid authentication input. In embodiments, configuring may include setting a fixed number of times that the second valid authentication input may be used to authenticate with the computing asset (e.g., 1 time, 3 times, 10 times). In embodiments, configuring may include selecting a particular geographic location (e.g., 3 mile radius from a certain address) or type of area (e.g., public area, public transportation area) in which the second valid authentication input may be used. In embodiments, in response to achieving (e.g., fulfilling, completing) the expiration for the second valid authentication input, the activation of the second valid authentication input and the deactivation of the first valid authentication input may be disabled. In embodiments, disabling the activation of the second valid authentication input and the deactivation of the first valid authentication input may include requiring that the first valid authentication input (e.g., primary password) be entered in order to grant access to the computing asset. As an example, consider a situation in which a first valid authentication input of "daffodil" and a second valid authentication input of "rose" are established with respect to the computing asset. An expiration of 1 usage may be configured for the second valid authentication input of "rose." Accordingly, in response to receiving an authentication request from a user that includes the second valid authentication input, the authentication input of "rose" may be disabled (e.g., no longer accepted for authentication with the computing asset), and the first valid authentication input of "daffodil" may be activated such that subsequent authentication inputs must include the password "daffodil" in order to be granted. Other methods of configuring the expiration for the second valid authentication input are also possible.

In embodiments, access enablement may be authenticated with respect to the computing asset. The access enablement may be based on the first value. Aspects of the disclosure, in embodiments, relate to providing access to the computing asset in response to receiving a first value that matches an established first value. In embodiments, access validation may occur at block 293. The access validation (e.g., granting authentication request, providing access to the asset) may occur when the first value matches an established first value (e.g., pre-set, preconfigured first value). The established first value may correspond to the second valid authentication input (e.g., temporary, provisional password, activated in response to the triggering event). In embodiments, validating access may include comparing the first value included in an authentication request with the established first value stored in an authentication management database of the computing asset, and ascertaining that the first value matches (e.g., corresponds with, achieves a similarity threshold with respect to) the established first value. Accordingly, in response to determining the match between the first value and the established first value, the authentication request may be granted and access to the computing asset may be allowed. In embodiments, access invalidation may occur at block 294. The access invalidation may occur when the first value mismatches the established first value. The established first value may correspond to the second valid authentication input. In embodiments, invalidating access may include comparing the first value included in an authentication request with the established first value stored in an authentication management database of the computing asset, and ascertaining that the first value mismatches (e.g., diverges from, disagrees with, fails to achieve a similarity threshold with respect to) the established first value. Accordingly, in response to determining the mismatch (e.g., discrepancy) between the first value and the established first value, the authentication request may be denied and access to the computing asset may be prevented. Other methods of validating and invalidating access based on the first value are also possible.

In embodiments, the first established value may be updated at block 296. This update may occur based on and in response to receiving the second valid authentication input. The second valid authentication input may include the first value and the second value. The first established value may be updated to be the second value. The established first value may correspond to the second valid authentication input. As described herein, aspects of the disclosure relate to reconfiguring the authentication inputs of the computing asset on-the-fly by using a second value of the second valid authentication input to update the first established value. Generally, updating can include adjusting, revising, modifying, altering, setting, configuring, or otherwise changing the first established value to the second value. In embodiments, updating the first established value may include receiving an authentication request having a second valid authentication input that includes both the first value and the second value. The first value may include a current second valid authentication input (e.g., first temporary password) and the second value may include a future second valid authentication input (e.g., next, subsequent password). In this way, the computing asset may receive the authentication request, and use the first value to authenticate with the computing asset, and the second value may be recorded in an authentication input database as the first value for subsequent authentication requests (e.g., defined as a new temporary password). Consider the following example. A user may enter a first value including a first temporary password of "Newton," and subsequently enter a second value (e.g., separated from the first value by a delimiter) of "Leibniz." Accordingly, the first value of "Newton" may be compared with a pre-established second valid authentication input, and be used to authenticate the user with the computing asset (e.g., allow the user to log in to the device, software program of the device, or the like), and the second value of "Leibniz" may be established with respect to the computing asset as a future second valid authentication input to be used for one or more subsequent authentication sessions. As such, the next time a user initiates an authentication session with the computing asset, the second value of "Leibniz" may be used (e.g., as the first value) to facilitate validation with respect to the computing asset. Other methods of updating the first established value are also possible.

In embodiments, deactivation of the second valid authentication input and activation of the first valid authentication input may occur at block 297. Aspects of the disclosure relate to the recognition that, in response to authenticating access to the computing asset using the second valid authentication input, configuring the authentication protocol of the computing asset to authenticate subsequent authentication requests using the first valid authentication input may positively impact asset security. The second valid authentication input may be deactivated with respect to access enablement to the computing asset. The deactivation may occur based on and in response to authenticating access enablement with respect to the computing asset. In embodiments, in response to verifying that a second valid authentication input received by the computing asset matches an established first value, the computing asset may authenticate access enablement (e.g., provide access to the computing asset) and reconfigure the authentication management database to remove the second valid authentication input from a list of valid inputs (e.g., such that the second valid authentication input may no longer be used to authenticate with the computing asset). In embodiments, authenticating access enablement with respect to the computing asset may be based on and in response to receiving the second valid authentication input. The first valid authentication input may be activated with respect to access enablement to the computing asset. The activation may occur based on and in response to authenticating access enablement with respect to the computing asset. In embodiments, subsequent to providing access to the computing asset using the second valid authentication input, the computing asset may reconfigure the authentication management database to add the first valid authentication input a list of valid inputs. In this way, subsequent authentication requests that include the second valid authentication input may be denied, and authentication requests that include the first valid authentication input may be allowed. Other methods of deactivating the second valid authentication input and activating the first valid authentication input are also possible.

In embodiments, a set of operations (e.g., performing, receiving, authenticating) may occur at block 298. A deactivation operation and an activation operation may be performed in an automated fashion without user intervention (e.g., by automated computing machinery without manual action). The second valid authentication input may be deactivated and the first valid authentication input may be activated. As described herein, deactivating the second valid authentication input and activating the first valid authentication input may include configuring an authentication management database of the computer asset to remove the second valid authentication input from a list of valid inputs, and add the first valid authentication input to the list of valid inputs (e.g., such that subsequent authentications may require the first valid authentication input and reject the second valid authentication input). The first valid authentication input may be received. The reception may occur via the graphical user interface. As an example, a user may use a keypad provided by the graphical user interface to enter the first valid authentication input (e.g., "ILoveHawaii") with respect to the computing asset. Access enablement with respect to the computing asset may be authenticated. This authentication may be based on and in response to receiving the first valid authentication input. For instance, the first valid authentication input may be compared with an established first value, and it may be ascertained that the first valid authentication input matches the established first value (e.g., all characters, symbols, capitalization sizes, and other aspects agree between the first valid authentication input and the established first value). In response to ascertaining the match between the first valid authentication input and the established first value, the authentication request may be granted and access to the computing asset may be provided to the user who entered the first valid authentication input. Other methods of performing the set of actions are also possible.

Method 200 concludes at block 299. Aspects of method 200 may provide performance or efficiency benefits for authentication management. As an example, a user in a public place may use the second valid authentication input (e.g., temporary password) to simultaneously access a computing asset and define a future second valid authentication input (e.g., next temporary password) to positively impact computing asset security (e.g., an unauthorized onlooker who obtained the computing asset and entered an observed password may be denied authentication access). Altogether, leveraging a temporary password and dynamic password configuration with respect to access management may be associated with benefits including access authentication security, data privacy, and operation efficiency.

Figure 3:
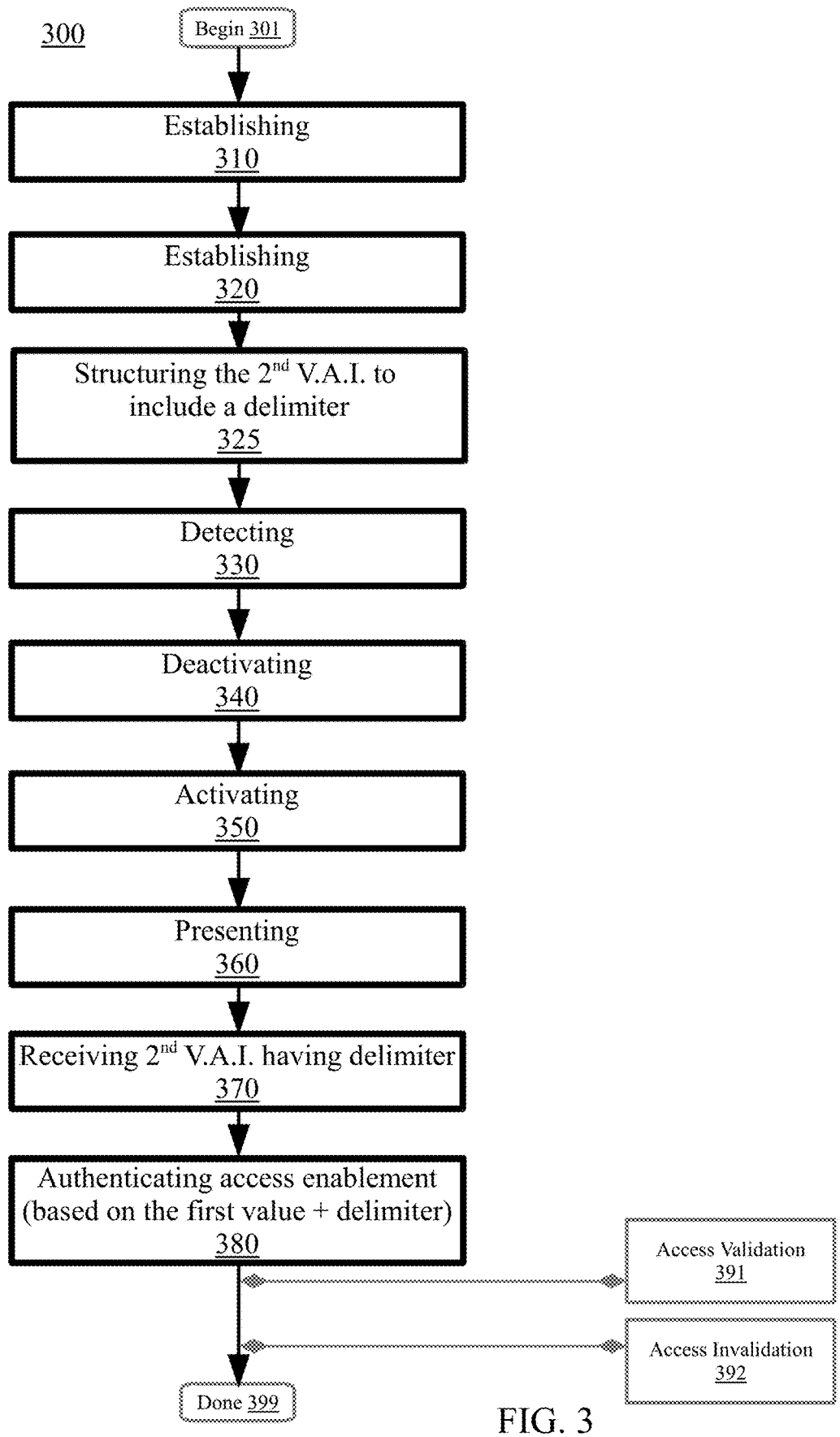
FIG. 3 is a flowchart illustrating a method for authentication management, according to embodiments.

FIG. 3 is a flowchart illustrating a method 300 for authentication management. Aspects of FIG. 3 relate to authenticating access enablement to a computing asset based on a second valid authentication input including a delimiter. Aspects of method 300 may be similar or the same as aspects of method 200, and aspects may be utilized interchangeably with one or more methodologies described herein. The method 300 may begin at block 301. At block 310, a first valid authentication input may be established. The first valid authentication input may be established with respect to access enablement to a computing asset. At block 320, a second valid authentication input may be established. This may occur with respect to access enablement to the computing asset. The second valid authentication input may differ from the first valid authentication input.

At block 325, the second valid authentication input may be structured to include a delimiter. Generally, structuring can include generating, assembling, building, forming, creating, arranging, organizing, or otherwise formatting the second valid authentication input to include a delimiter. The delimiter may include a sequence of one or more characters used to specify the boundary between separate or independent portions or regions of the first or second valid authentication input. In embodiments, the delimiter may be used to separate or distinguish between a first value and a second value of the first or second valid authentication input. The delimiter may include a specific character (e.g., letter, number), punctuation mark (e.g., period, comma, semicolon, colon, dash, underscore, question mark), symbol (e.g., dollar sign, pound sign) or the like. In embodiments, structuring the second valid authentication input may include generating a second valid authentication input having a first value and a second value separated by the delimiter. As an example, consider a situation in which the second valid authentication input includes a first value of "mountain" and a second value of "climbing." As described herein, the second valid authentication input may be structured such that the first value and the second value are separated by a delimiter including an exclamation mark. Accordingly, the second valid authentication may be structured as "mountain!climbing." In embodiments, a list of one or more recognized delimiters may be selected (e.g., predetermined by a user) and saved with respect to the authentication management database of the computing asset. Other methods of structuring the second valid authentication input to include the delimiter are also possible.

At block 330, a triggering event may be detected. At block 340, the first valid authentication input may be deactivated. The deactivation may occur with respect to access enablement to the computing asset. The deactivation may be based on and in response to the detection of the triggering event. At block 350, the second valid authentication input may be activated. The activation may occur with respect to access enablement to the computing asset. The activation may be based on and in response to detecting the triggering event. At block 360, the graphical user interface may be presented. The graphical user interface may appear to prompt for the first valid authentication input.

In embodiments, the second valid authentication input may be received via the graphical user interface at block 370. The second valid authentication input may include the delimiter. Generally, receiving can include sensing, detecting, recognizing, collecting, or otherwise accepting delivery of the second valid authentication input including the delimiter. In embodiments, receiving can include capturing the second valid authentication input together with the delimiter via the graphical user interface. As an example, in embodiments, a user may initiate an authentication request with respect to the computing asset. The graphical user interface may prompt the user for an authentication input. Accordingly, the user may enter a second valid authentication input including a first value (e.g., current temporary password) followed by a delimiter (e.g., #) and a second value (e.g., next temporary password). As an example, the user may submit a second valid authentication input of "rocky#mountains" (e.g., where "rocky" is the first value, "#" is the delimiter, and "mountains" is the second value). Other methods of receiving the second valid authentication input including the delimiter are also possible.

In embodiments, access enablement with respect to the computing asset may be authenticated at block 380. The access enablement authentication may be based on the first value and the delimiter. Generally, authenticating can include authorizing, verifying, confirming, allowing, permitting, approving, or otherwise validating access enablement with respect to the computing asset. In embodiments, authenticating may include parsing an authentication input, and identifying a delimiter. A string of characters that precede the delimiter may be identified as a first value, and a string of characters that follow the delimiter may be identified as a second value. The computing asset may compare both the first value (e.g., current temporary password) and the delimiter (e.g., symbol or character such as "%") of the second valid authentication input with an index of valid authentication inputs recorded in an authentication management database. In response to determining that the first value matches an established first value of the authentication management database and the delimiter matches one or more predetermined delimiters of the authentication management database, access permission with respect to one or more aspects or features of the computing asset may be provided to a user. In embodiments, authenticating may include unlocking the computing asset to allow a user to perform one or more operations (e.g., running an application, executing a command, modifying settings or parameters) with respect to the computing asset. Other methods of authenticating access enablement with respect to the computing asset based on the first value and the delimiter are also possible.

In embodiments, access may be validated when the delimiter matches an established delimiter (which corresponds to the second valid authentication input) at block 391. Generally, validating can include authorizing, verifying, permitting, or otherwise allowing access to the computing asset when the delimiter matches an established delimiter. As an example, consider a situation in which the authentication management database includes the following list of established delimiters (e.g., where each delimiter is separated from the next by a semicolon): !; #; $; %; ^; ~; &; *. Accordingly, in response to receiving a second valid authentication input of "October&November," it may be determined that the delimiter of "&" matches a delimiter of the list of established delimiters, and access to the computing asset may be validated. In embodiments, access may be invalidated when the delimiter mismatches the established delimiter (which corresponds to the second valid authentication input) at block 392. Generally, invalidating may include blocking, preventing, rejecting, denying, or otherwise limiting access to the computing asset when the delimiter mismatches an established delimiter. As an example, in response to receiving a second valid authentication input of "October_November," it may be determined that the delimiter of "_" does not match a delimiter of the list of established delimiters, and access to the computing asset may be prevented. Other methods of validating and invalidating access based on the delimiter are also possible.

Consider the following example. A user may establish a first valid authentication input of "peanutbutter" and a second valid authentication input of "jelly" with respect to access enablement of a computing asset including a tablet device. The user may also establish a delimiter of "$" and a predetermined triggering event of "500 meter distance from home address." Accordingly, while the user is within 500 meters of his or her home address, he or she may use the first valid authentication input of "peanutbutter" to authenticate with the tablet device. In embodiments, the user may leave his or her home address and travel to a train station 800 meters from his or her home address. Accordingly, upon traveling 500 meters from the home address, the tablet device may detect that the triggering event has been achieved, and deactivate the first valid authentication input of "peanutbutter" and activate the second valid authentication input of "jelly." As such, as long as the triggering event is achieved, the password "peanutbutter" may no longer be accepted as a valid authentication input, and only authentication requests that include the second valid authentication input of "jelly" may be used to access the tablet device. In embodiments, while at the train station, the user may initiate an authentication session with the table device, and be presented with a graphical user interface that appears to prompt for the first valid authentication input. The user may enter a second valid authentication input of "jelly$bananas" into the graphical user interface. Accordingly, the tablet device may parse the second valid authentication input, and verify that the first value of "jelly" matches the established first value, and that the delimiter of "$" matches the established delimiter. In response to determining the match of the first value and the delimiter, authentication may be performed and access to the tablet device may be granted. In embodiments, as described herein, the tablet device may be configured to identify the string of characters following the delimiter (e.g., "bananas) as a second value. As such, the second value of "bananas" may be saved as a new first value with respect to access enablement of the tablet device. In this way, subsequent authentication requests may require specification of the new first value of "bananas" in order to grant access authorization for use of the tablet device. Other methods of authentication management are also possible. Method 300 concludes at block 399. Aspects of method 300 may provide performance or efficiency benefits including access authentication security, data privacy, and operation efficiency.

Figure 4:
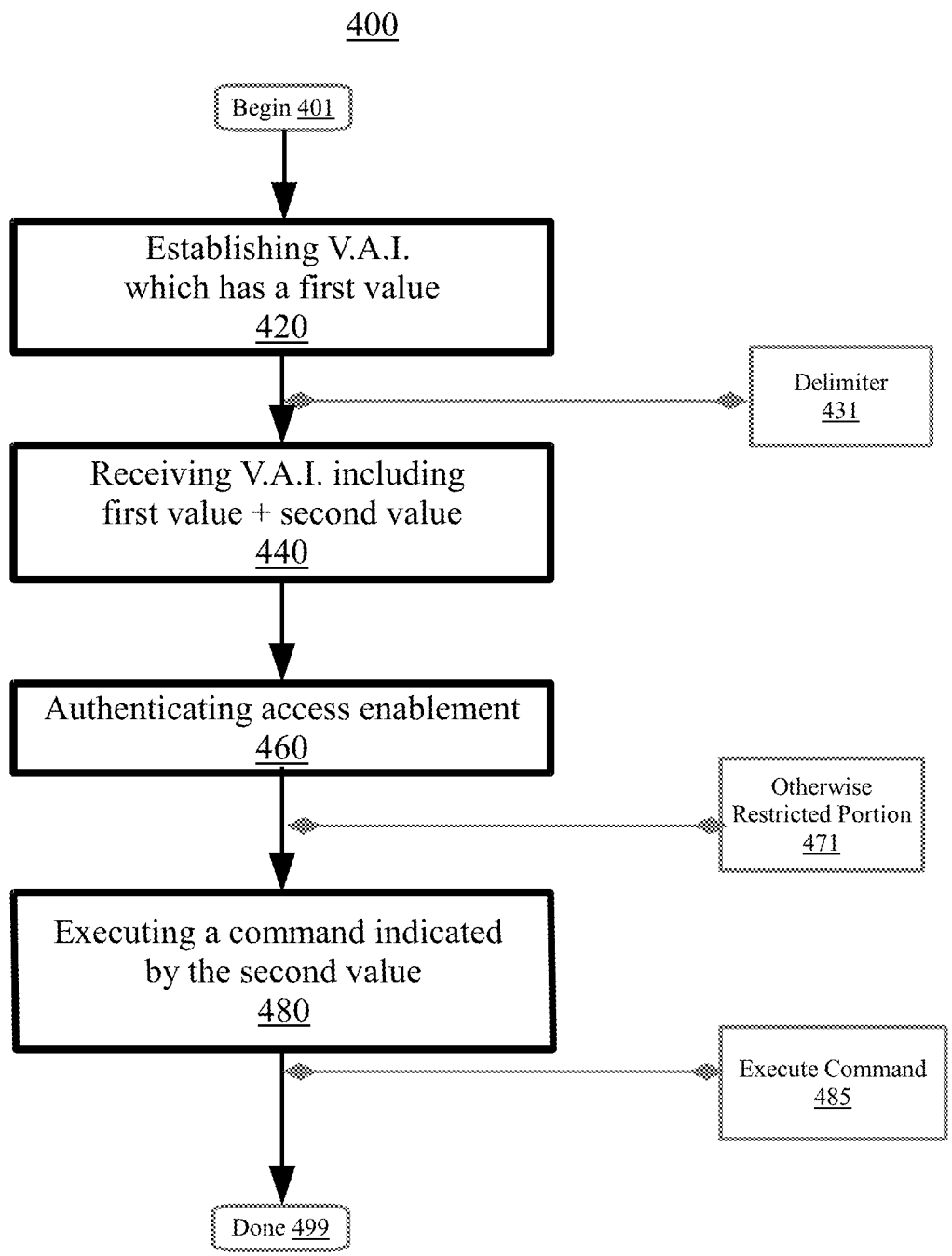
FIG. 4 is a flowchart illustrating a method for authentication management, according to embodiments.

FIG. 4 is a flowchart illustrating a method 400 for authentication management, according to embodiments. Aspects of FIG. 4 relate to executing a command based on an authentication input to a computing asset. Aspects of method 400 may be similar or the same as aspects of method 200/300, and aspects may be utilized interchangeably with one or more methodologies described herein. The method 400 may begin at block 401.

At block 420, a valid authentication input may be established. The valid authentication input may have a first value. The establishment may occur with respect to access enablement to a computing asset. Generally, establishing can include defining, instituting, specifying, setting, assigning, designating, or otherwise creating the valid authentication input. As described herein, the valid authentication input may include a form of credentials provided to the computing asset in order to verify the authorization of a user to access the computing asset. For instance, the valid authentication input may include a sequence or string of characters, symbols, or other information that may be used to verify the authorization of a user to access the computing asset. As examples, the valid authentication input may include a password, token (e.g., hardware or software token), biometric data (e.g., fingerprint, retina scan), answer to a security question, visual identifier, pattern input, or the like. In embodiments, the valid authentication input may include a first value. The first value may include an alphanumeric sequence or string of characters or symbols that may serve as a default or primary authentication key of a user in order to authenticate with the computing asset (e.g., primary password). In embodiments, establishing the valid authentication input may include receiving an instruction from a user to define the first value. For instance, an instruction may be received from a user that defines an alphanumeric sequence of "beekeeper4life" as the first value. In embodiments, the alphanumeric sequence of "beekeeper4life" may be saved or recorded as the first value of the valid authentication input in an authentication management database. Other methods of establishing the valid authentication input having a first value are also possible.

In embodiments, the valid authentication input may be structured to include a delimiter at block 431. This delimiter may separate the first and second values. Generally, structuring can include generating, assembling, building, forming, creating, arranging, organizing, or otherwise formatting the valid authentication input to include a delimiter. The delimiter may include a sequence of one or more characters used to specify the boundary between separate or independent portions or regions of the first or second valid authentication input. In embodiments, the delimiter may be used to separate or distinguish between a first value and a second value of the valid authentication input. The delimiter may include a specific character (e.g., letter, number), punctuation mark (e.g., period, comma, semicolon, colon, dash, underscore, question mark), symbol (e.g., dollar sign, pound sign) or the like. In embodiments, structuring the valid authentication input may include generating a valid authentication input having a first value and a second value separated by the delimiter. As an example, consider a situation in which the valid authentication input includes a first value of "Atlantic" and a second value of "Pacific." As described herein, the valid authentication input may be structured such that the first value and the second value are separated by a delimiter including a question mark. Accordingly, the valid authentication may be structured as "Atlantic?Pacific." Other methods of structuring the second valid authentication input to include the delimiter are also possible.

At block 440, the valid authentication input may be received via a graphical user interface. The valid authentication input may include both the first value and the second value. The second value may differ from the first value. Generally, receiving can include sensing, detecting, recognizing, collecting, or otherwise accepting delivery of the valid authentication input. In embodiments, the second value may include an alphanumeric sequence or string of characters or symbols that indicates an instruction, request, directive, or command to the computing asset. As an example, the second value may include a phrase of "app1boot," which instructs the computing asset to initiate a boot sequence for a particular application (e.g., pre-selected application associated with an identifier of "app1"). In embodiments, receiving can include capturing the valid authentication input via the graphical user interface. As an example, the graphical interface may accept a valid authentication input of "beekeeper4life*app1boot," where "beekeeper4life" indicates a first value (e.g., for authentication with the computing asset), "*" indicates a delimiter, and "app1boot" indicates a second value (e.g., instruction or request to the computing asset). Other methods of receiving the valid authentication input receiving the first and second value are also possible.

At block 460, access enablement with respect to the computing asset may be authenticated. The authentication may occur in response to receiving the valid authentication input. The authentication may occur based on the first value. Generally, authenticating can include authorizing, verifying, confirming, allowing, permitting, approving, or otherwise validating access enablement with respect to the computing asset. In embodiments, authenticating may include comparing the first value of the valid authentication input with an index of valid authentication inputs recorded in an authentication management database. In response to determining that the first value matches (e.g., corresponds with) a first value of an established valid authentication input of the authentication management database, access permission with respect to one or more aspects or features of the computing asset may be provided to a user. In embodiments, authenticating may include unlocking the computing asset to allow a user to perform one or more operations (e.g., running an application, executing a command, modifying settings or parameters) with respect to the computing asset. In certain embodiments, authenticating may include modifying a set of access permissions of the computing asset to disable one or more security measures, or enable access to one or more functions of the computing asset. Other methods of authenticating access enablement with respect to the computing asset are also possible.

In embodiments, access enablement to an otherwise restricted portion of the computing asset may occur at block 471. The authentication (e.g., authorization, validation, verification) may execute the command indicated by the second value. Aspects of the disclosure relate to the recognition that, in some situations, particular portions of a computing asset may be restricted, protected, or otherwise secured against unauthorized access. Accordingly, aspects of the disclosure relate to providing access to the otherwise restricted portion of the computing asset in order to execute a command indicated by the second value. In embodiments, the otherwise restricted portion may include a memory location (e.g., partition), data set (e.g., file, folder, collection of information), function (e.g., communication function, parameter configuration function) or the like. In embodiments, the otherwise restricted portion may include a collection of sensitive (e.g., classified, high value, confidential) data only accessible by users with administrative access. As described herein, authenticating access enablement may include allowing a user to access the otherwise restricted portion of the computing asset. For instance, in embodiments, authenticating access enablement may include permitting a user to perform read operations or write operations (e.g., indicated by the second value of the valid authentication input) with respect to the otherwise restricted portion of the computing asset. As an example, the second value may indicate a write operation in which one or more aspects of the restricted portion are modified with the addition of new data. Other methods of enabling access to otherwise restricted portions of the computing asset are also possible.

At block 480, a command indicated by the second value may be executed. Execution may occur in response to receiving the valid authentication input. Execution may be based on the second value. As described herein, aspects of the disclosure relate to using a second value of a valid authentication input to indicate a command to be performed with respect to the computing asset. Generally, executing can include implementing, carrying-out, initiating, accomplishing, enacting, or otherwise performing the command indicated by the second value. In embodiments, a set of second values may be associated with a set of commands in the authentication management database, such that each second value corresponds to a different command of the set of commands. The set of second values may be configurable by a user. Upon receiving a particular second value, the computing asset may consult the authentication management database, identify the command associated with the particular second value, and subsequently implement the command. For instance, as examples, a second value of "app1boot" may be associated with a command of opening a first application, a second value of "app2close" may be associated with a command of terminating a second application, a second value of "mailcheck" may be associated with a command of refreshing an email inbox, a second value of "config1" may be associated with a command set a set of parameters to a first configuration, and the like. As an example, in response to receiving a valid authentication input of "spiderweb:callcontact1," the computing asset may ascertain a first value of "spiderweb" which may be used to authenticate with the computing asset, a delimiter of ":" to separate the first and second value, and a second value of "callcontact1" which indicates a command to initiate a phone call to a first registered contact. Accordingly, authentication with the computing asset may be performed, and a telephone call to the first registered contact may be carried-out to execute the command indicated by the second value. Other methods of executing the command based on the second value are also possible.

In embodiments, command execution may occur at block 485. The valid authentication input may be structured to include a delimiter. The command indicated by the second value may be executed based on the delimiter. Aspects of the disclosure, in certain embodiments, relate to using a delimiter included in the valid authentication input to modify execution of a command. Generally, executing can include implementing, carrying-out, initiating, accomplishing, enacting, or otherwise performing the command indicated by the second value based on the delimiter. In embodiments, a second value may be associated with one or more of a number of delimiters which each have different impacts on command execution. For instance, different delimiters may be coupled with the second value to influence how a particular command is executed. As an example, consider a second value of "strengthensecurity" that is associated with a command of requiring multi-factor authentication (e.g., security process requiring two or more verification procedures) before access to the computing asset is granted. The second value may be associated with a set of potential delimiters which each has different impacts on how the command is performed. For instance, a delimiter of "?" may indicate that the command require two-factor authentication, a delimiter of "#" may indicate that the command require three-factor authentication, and a delimiter of "!" may indicate the command require four-factor authentication. Accordingly, in response to receiving a valid authentication input of "jogging#strengthensecurity," the presence of the "#" delimiter may indicate that a command requiring three-factor authentication be performed, whereas for a valid authentication input of "jogging!strengthensecurity," the presence of the "!" delimiter may indicate that a command requiring four-factor authentication be performed. Other methods of executing a command indicated by the second value based on a delimiter are also possible. Method 400 concludes at block 499. Aspects of method 400 may provide performance or efficiency benefits including access authentication security, data privacy, and operation efficiency.

Figure 5:
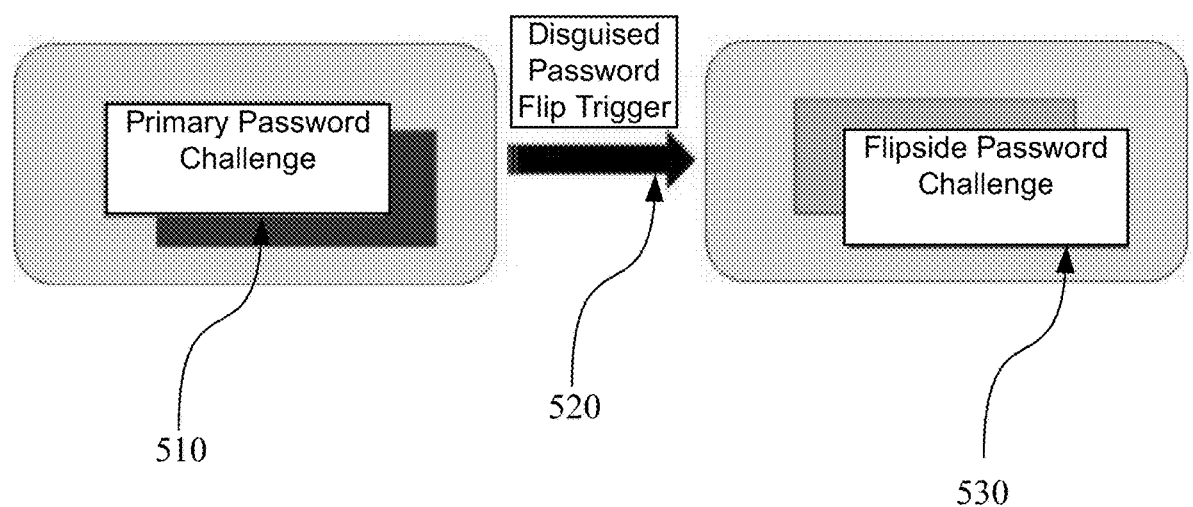
FIG. 5 illustrates an example system for authentication management, according to embodiments.

FIG. 5 illustrates an example system for authentication management, according to embodiments. Aspects of FIG. 5 relate to an authentication management system 500 that is configured to convert (e.g., flip, switch) between a primary password challenge 510 (e.g., active password; first valid authentication input) and a flipside password challenge 530 (e.g., inactive password; second valid authentication input) to positively impact security with respect to a computing asset. The primary password challenge 510 may include a default authentication protocol of the computing asset in which a user verifies his or her authorization to access the computing asset using a first valid authentication input such as a password, token (e.g., hardware or software), biometric identifier, or the like. In embodiments, as described herein, the authentication management system 500 may be configured to detect (e.g., sense, identify, determine) a disguised password flip trigger 520 (e.g., triggering event). The disguised password flip trigger 520 may include a parameter, criterion, condition, threshold, or other stipulation, which, when achieved, instigates/causes the authentication management system to convert from the primary password challenge 510 to the flipside password challenge 530. As examples, the disguised password flip trigger 520 may include a user gesture, drawn character input on a screen, input on an unlocked screen, device rotation, or key press sequence. In embodiments, in response to detecting the disguised password flip trigger 520, the authentication management system 500 may configured to convert to the flipside password challenge 530. The flipside password challenge 530 may include an alternate (e.g., secondary, temporary) authentication protocol of the computing asset which requires a user to verify his or her authorization to access the computing asset using a second valid authentication input that is different than the first valid authentication input required by the primary password challenge 510. In embodiments, the flipside password challenge 530 may require input of both the first and second valid authentication inputs in order to provide access to the computing device. In certain embodiments, the flipside password challenge 530 may be configured to allow for dynamic reconfiguration (e.g., setting, modifying, defining) of one or more authentication inputs (e.g., to be used for subsequent authentication sessions). Other types of authentication management systems are also possible.

Figure 6:
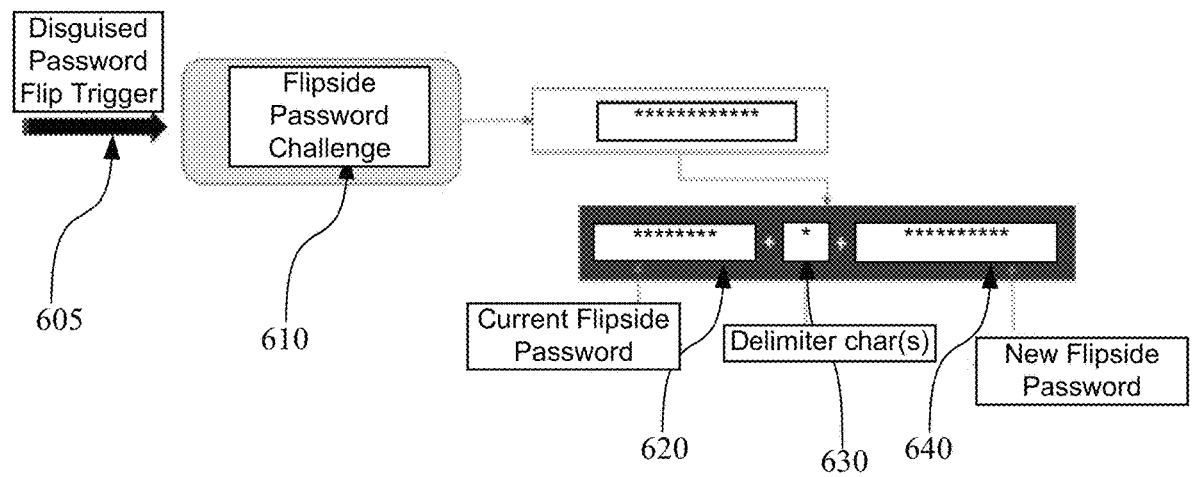
FIG. 6 illustrates an example system for authentication management, according to embodiments.

FIG. 6 illustrates an example system for authentication management, according to embodiments. Aspects of FIG. 6 relate to an authentication management system 600 that may be configured for dynamic modification (e.g., setting, defining, reconfiguring) of one or more authentication inputs for subsequent authentication sessions. As described herein, the authentication management system 600 may be configured to detect a disguised password flip trigger 605, and convert to a flipside password challenge 610. In embodiments, the flipside password challenge 610 may include a graphical user interface configured to accept input of a first value 620 and a second value 640 separated by a delimiter 630. In embodiments, the first value 620 may include a current flipside password, and the second value may include a new flipside password to be used for a subsequent authentication sessions. For instance, the first value 620 may be compared to a database of established passwords, and in response to determining a match between the current flipside password and an established password, access to the computing asset may be granted. In embodiments, the second value 640 may be added to the database of established passwords (e.g., together with an expiration such as 1 time usage, 5 minute time period) such that the next time the user initiates an authentication session with the computing asset, the new flipside password may be required as the first value 620.

Consider the following example. In response to detecting a disguised password flip trigger 605 of a 180 degree rotation to the orientation of the computing asset, the authentication management system 600 may convert to the flipside password challenge 610. A user may submit an authentication request to the authentication management system 600. The authentication request may include an authentication input of "Macaroni&Cheese." The authentication management system 600 may parse the authentication input, and identify "Macaroni" as the first value 620, "&" as the delimiter 630, and "Cheese" as the second value 640. As described herein, the authentication management system 600 may compare the first value 620 of "Macaroni" with the authentication database, and provide access to the computing asset in response to determining a match with an established first value in the database. In embodiments, the authentication management system 600 may identify "Cheese" as a new flipside password. Accordingly, the authentication management system 600 may remove "Macaroni" from the set of established first values (e.g., so that it may no longer be used for authentication with the computing asset), and "Cheese" may be added to the set of established first values for use for subsequent authentication requests. In this way, a subsequent authentication request may specify "Cheese" as the first value 620 for authentication with the computing asset. Other types of authentication management systems are also possible.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A method for authentication management, the method comprising:

establishing, with respect to access enablement to a computing asset, a valid authentication input which has a first value;

receiving, via a graphical user interface, the valid authentication input including the first value and a second value which differs from the first value;

authenticating, in response to receiving the valid authentication input and based on the first value, access enablement with respect to the computing asset; and executing, in response to receiving the valid authentication input and based on the second value, a command indicated by the second value.

2. The method of claim 1, further comprising:

structuring the valid authentication input to include a delimiter which separates the first and second values.

3. The method of claim 2, further comprising:

authenticating, based on the first value and the delimiter, access enablement with respect to the computing asset.

4. The method of claim 1, wherein executing the command indicated by the second value is further in response to detecting a triggering event.

5. The method of claim 4, wherein the triggering event is selected from the group consisting of a user gesture, a user input on an unlocked graphical user interface, a device rotation which exceeds a threshold degree of rotation, an unlock key sequence, a specific geo-location, a distance from a particular geo-location that exceeds a threshold distance, and a temporal factor.

6. The method of claim 1, further comprising:

configuring an expiration for the command indicated by the second value; and disabling, in response to achieving the expiration, the command indicated by the second value.

7. A computer program product for authentication management, the computer program product comprising one or more non-transitory computer-readable storage media and program instructions stored on the one or more non-transitory computer-readable storage media, the program instructions comprising:

program instructions to establish, with respect to access enablement to a computing asset, a valid authentication input which has a first value;

program instructions to receive, via a graphical user interface, the valid authentication input including the first value and a second value which differs from the first value;

program instructions to authenticate, in response to receiving the valid authentication input and based on the first value, access enablement with respect to the computing asset; and program instructions to execute, in response to receiving the valid authentication input and based on the second value, a command indicated by the second value.

8. The computer program product of claim 7, further comprising:

program instructions to structure the valid authentication input to include a delimiter which separates the first and second values.

9. The computer program product of claim 8, further comprising:

program instructions to authenticate, based on the first value and the delimiter, access enablement with respect to the computing asset.

10. The computer program product of claim 7, wherein the program instructions to execute the command indicated by the second value is further in response to detecting a triggering event.

11. The computer program product of claim 10, wherein the triggering event is selected from the group consisting of a user gesture, a user input on an unlocked graphical user interface, a device rotation which exceeds a threshold degree of rotation, an unlock key sequence, a specific geo-location, a distance from a particular geo-location that exceeds a threshold distance, and a temporal factor.

12. The computer program product of claim 7, further comprising:
program instructions to configure an expiration for the command indicated by the second value; and
program instructions to disable, in response to achieving the expiration, the command indicated by the second value.

13. A computer system for authentication management, the computer system comprising:
one or more computer processors, one or more non-transitory computer-readable storage media, and program instructions stored on one or more of the non-transitory computer-readable storage media for execution by at least one of the one or more processors, the program instructions comprising:
program instructions to establish, with respect to access enablement to a computing asset, a valid authentication input which has a first value;
program instructions to receive, via a graphical user interface, the valid authentication input including the first value and a second value which differs from the first value;
program instructions to authenticate, in response to receiving the valid authentication input and based on the first value, access enablement with respect to the computing asset; and
program instructions to execute, in response to receiving the valid authentication input and based on the second value, a command indicated by the second value.

14. The computer system of claim 13, further comprising:
program instructions to structure the valid authentication input to include a delimiter which separates the first and second values.

15. The computer system of claim 14, further comprising:
program instructions to authenticate, based on the first value and the delimiter, access enablement with respect to the computing asset.

16. The computer system of claim 13, wherein the program instructions to execute the command indicated by the second value is further in response to detecting a triggering event.

17. The computer system of claim 16, wherein the triggering event is selected from the group consisting of a user gesture, a user input on an unlocked graphical user interface, a device rotation which exceeds a threshold degree of rotation, an unlock key sequence, a specific geo-location, a distance from a particular geo-location that exceeds a threshold distance, and a temporal factor.

18. The computer system of claim 13, further comprising:
program instructions to configure an expiration for the command indicated by the second value; and
program instructions to disable, in response to achieving the expiration, the command indicated by the second value.

* * * * *

UNITED STATES PATENT AND TRADEMARK OFFICE
CERTIFICATE OF CORRECTION

| | | |
|---|---|---|
| PATENT NO. | : 10,713,349 B2 | Page 1 of 1 |
| APPLICATION NO. | : 15/991958 | |
| DATED | : July 14, 2020 | |
| INVENTOR(S) | : Akash U. Dhoot, Nitin S. Jadhav and Shailendra Moyal | |

It is certified that error appears in the above-identified patent and that said Letters Patent is hereby corrected as shown below:

On the Title Page

Item (63), Related U.S. Application Data should read:
--(63) Continuation of application No. 15/973,592, filed on May 8, 2018, now U.S. Pat. No. 10,204,218, which is a continuation of application No. 15/694,016, filed on Sep. 1, 2017, now U.S. Pat. No. 9,996,687, which is a continuation of application No. 15/375,440, filed on Dec. 12, 2016, now U.S. Pat. No. 10,007,780--.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*